(12) United States Patent
Park et al.

(10) Patent No.: US 6,970,221 B1
(45) Date of Patent: Nov. 29, 2005

(54) LIQUID CRYSTAL DISPLAY DEVICE AND METHOD OF FABRICATING THE SAME

(75) Inventors: Kwang Seop Park, Kumi-shi (KR); Dong Yeung Kwak, Daeku-shi (KR); Jae Young Chung, Pusan (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/689,599

(22) Filed: Oct. 13, 2000

(30) Foreign Application Priority Data

Oct. 15, 1999 (KR) ................................. 1999-44791

(51) Int. Cl.[7] .......................................... G02F 1/1343
(52) U.S. Cl. ...................... 349/138; 349/42; 349/43; 349/143
(58) Field of Search ........................... 349/138, 42–43, 349/143

(56) References Cited

U.S. PATENT DOCUMENTS

| 5,055,899 A | 10/1991 | Wakai et al. | |
| 5,463,483 A * | 10/1995 | Yamazaki | 349/41 |
| 5,641,974 A * | 6/1997 | den Boer et al. | 257/59 |
| 5,780,871 A | 7/1998 | den Boer et al. | |
| 5,920,084 A | 7/1999 | Gu et al. | |
| 5,955,744 A | 9/1999 | Gu et al. | 257/59 |
| 5,994,721 A | 11/1999 | Zhong et al. | |
| 5,995,178 A * | 11/1999 | Fujikawa et al. | 349/55 |
| 6,011,274 A | 1/2000 | Gu et al. | |
| 6,147,722 A * | 11/2000 | Shimada et al. | 349/43 |
| 6,359,672 B2 * | 3/2002 | Gu et al. | 349/138 |
| 2001/0002857 A1 * | 6/2001 | Shimada et al. | 349/138 |

* cited by examiner

Primary Examiner—Robert H. Kim
Assistant Examiner—Thanh-Nhan P. Nguyen
(74) Attorney, Agent, or Firm—McKenna Long & Aldridge LLP (57) ABSTRACT

A liquid crystal display device and a method of fabricating the same that is capable of speeding up a data charge time in a liquid crystal pixel cell in a liquid crystal display device with a high aperture ratio overlapping a pixel electrode and a signal wiring. In the device, a thickness and a dielectric constant of the organic insulating film are set such that a signal delay at the gate line and the data line can be reduced.

52 Claims, 9 Drawing Sheets

LIQUID CRYSTAL DISPLAY DEVICE AND METHOD OF FABRICATING THE SAME

This application claims the benefit of Korean Patent Application No. 1999-44791, filed on Oct. 15, 1999, which is hereby incorporated by reference for all purposes as if fully set forth herein.

BACKGROUND OF THE INVENTION

1. Field of the Invention

The present invention relates to a liquid crystal display device, and more particularly to a liquid crystal display device with a high aperture ratio having pixel electrodes overlapped with signal wiring that is capable of speeding up the data charging time of liquid crystal pixel cells. The present invention also is directed to a method of fabricating such a liquid crystal display device.

2. Discussion of the Related Art

Generally, an active matrix liquid crystal display (LCD) driving system displays a natural moving picture by employing thin film transistors (TFTs) as a switching device. Such a liquid crystal display has been commercially available for a monitor for a portable television and a lap-top type personal computer, etc. because it is easy to make a monitor having a smaller scale than the cathode ray tube or the Brown tube.

The active matrix LCD displays a picture corresponding to video signals such television signals on a pixel (or picture element) matrix having pixels arranged at each intersection between gate lines and data lines. Each pixel includes a liquid crystal cell for controlling the transmitted light quantity depending on a voltage level of a data signal from the data line. The TFT is formed at an intersection between the gate line and the data line and responds to a scanning signal (or gate pulse) from the gate line to thereby switch a data signal to be transmitted to the liquid crystal cell.

Figure 1:
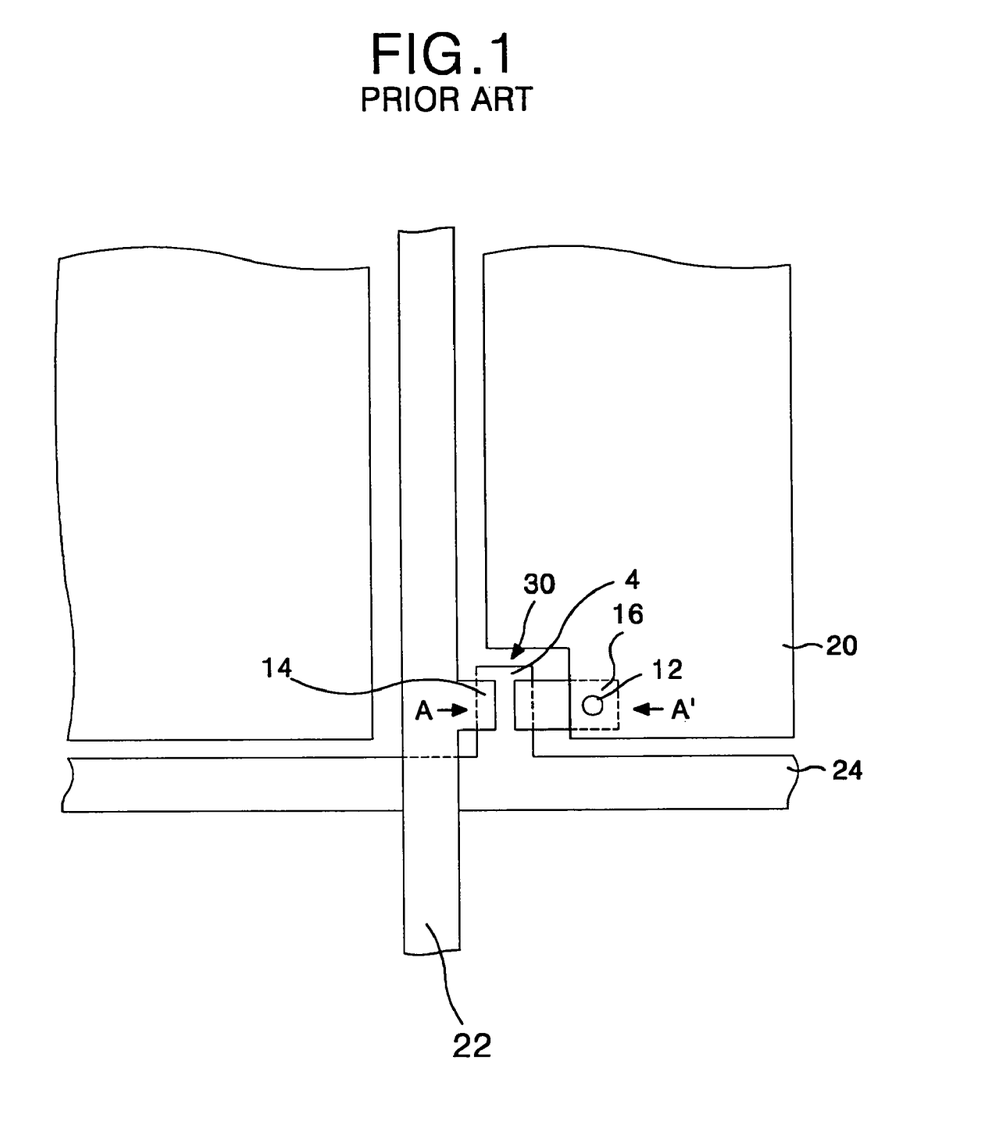
FIG. 1 is a plan view showing the structure of a conventional liquid crystal display device in which a pixel electrode is not overlapped with a signal wiring.
Figure 2:
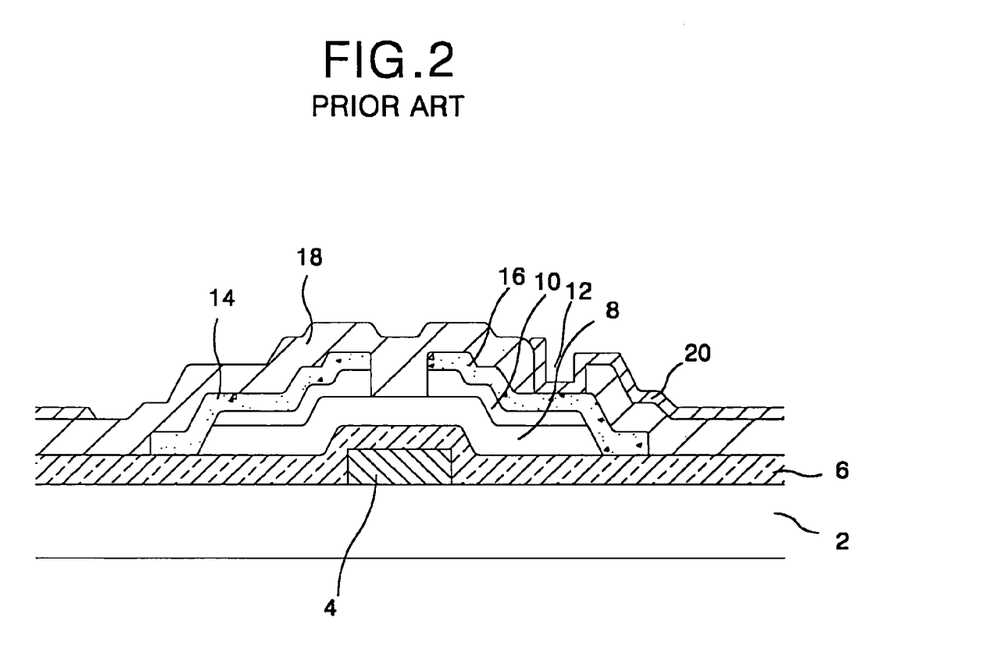
FIG. 2 is a sectional view of the thin film transistor taken along A–A' line in FIG. 1.

Typically, as shown in FIG. 1, the LCD has a TFT 30 formed at an intersection between a data line 22 and a gate line 24, and has pixel electrodes 20 arranged in a matrix pattern at a pixel area between the data line 22 and the gate line 24. The TFT 30 is formed on a transparent substrate 2 as shown in FIG. 2. The TFT 30 includes a gate electrode 4 connected to the gate line 24, a drain electrode 14 connected to the data line 22, and a source electrode 16 connected to the pixel electrode 20. A gate insulating film 6 made from an inorganic dielectric material such as $SiN_x$ is deposited on the entire transparent substrate 2 patterned with the gate electrode 4. On the gate insulating film 6, a semiconductor layer 8 made from amorphous silicon, hereinafter referred to as "a-Si", and an Ohmic contact layer 10 made from a-Si doped with n+ ions are sequentially formed to cover the gate insulating film 6 on the gate electrode 4. The drain electrode 14 and the source electrode 16 made from a metal each are formed on the Ohmic contact layer 10. The drain electrode 14 and the source electrode 16 are patterned in such a manner to be spaced by a predetermined channel width. Then, the Ohmic contact layer 10 is etched along a channel formed between the drain source 14 and the source electrode 16 to expose the semiconductor layer 8. A protective film 18 made from $SiN_x$ or $SiO_x$, etc. is deposited on the entire transparent substrate 2 to cover the TFT. The protective film 18 on the source electrode 16 is removed by etching to define a contact hole 12. The pixel electrode 20 made from Indium Tin Oxide is deposited in such a manner as to be connected to the source electrode 16 through the contact hole 12.

In the LCD as shown in FIG. 1, the pixel electrode 20 is patterned to make a distance of about 5 to 10 $\mu$m from the gate line 24. Also, a black matrix (not shown) is overlapped, by about 5 to 10 $\mu$m, with the pixel electrode 20. Thus, the LCD has an aperture ratio of about 50%. Accordingly, the LCD has low picture brightness as well as a large power consumed in the back light.

Figure 3:
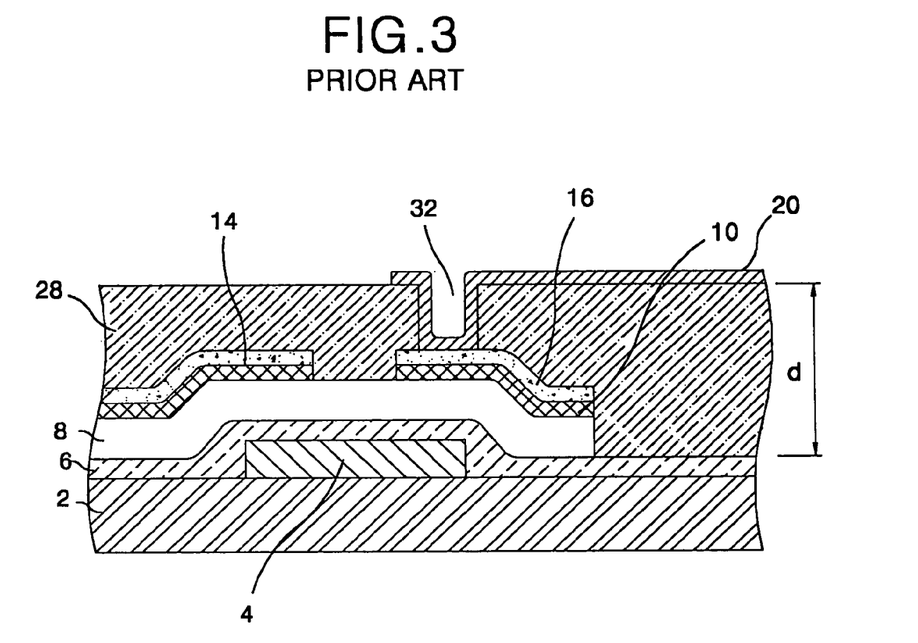
FIG. 3 is a sectional view showing the structure of the thin film transistor in a conventional liquid crystal display device using an organic insulating film as a protective film.

In order to improve an aperture ratio of the LCD, a scheme for allowing a pixel electrode to be overlapped with a gate line and a data line has been disclosed in U.S. Pat. No. 5,055,899. The LCD in the aforementioned patent uses an organic insulating film as a protective film 28 as shown in FIG. 3. This organic protective film 28 has its surface coated evenly by the spin coating technique into a thickness of 2000 to 8000 Å (or 0.2 to 0.8 $\mu$m). But the organic protective film 28 has a problem in that it generates a high parasitic capacitance at an overlapping area between the pixel electrode 20 and the data line 22, or the pixel electrode 20 and the gate electrode 24 because its thickness is small. Such a problem will be described in detail in conjunction with the following formula:

$$C = \frac{(\varepsilon \varepsilon_0 A)}{d} \quad (1)$$

wherein $\varepsilon$ represents a dielectric constant of the organic protective film 28, and $\varepsilon_0$ is $8.85 \times 10^{-14}$ F/cm. "A" represents an overlapping area between the pixel electrode 20 and the data line 22 or the pixel electrode 20 and the gate line 24, and "d" denotes a thickness of the organic protective film 28. As the thickness of the organic protective film 28 is very low to be about 0.2 to 0.8 $\mu$m as described above, a parasitic capacitance generated by the overlapping area in the pixel electrode 20 is increased to that extent. As a parasitic capacitance value caused by the overlapping area in the pixel electrode 20 increases as described above, a capacitance value at the data line 22 or the gate line 24 is enlarged. Since the parasitic capacitance having such a large value enlarges a delay value of a signal applied from the data line 22 or the gate line 24, the liquid crystal cells fails to charge video signals sufficiently within a limited charge time. As a result, a picture is distorted such that a desired color signal can not be expressed.

Meanwhile, since the protective film 18 in the LCD as shown in FIG. 1 is made from an inorganic material such SiN having a dielectric constant ($\varepsilon$) of about 6.7, or $SiO_2$ having a dielectric constant ($\varepsilon$) of about 3.9, etc., it generates a very large parasitic capacitance when the pixel electrode 20 is overlapped with the data line 22 and the gate line 24 with the protective film 18 therebetween. As a result, in the LCD using an inorganic material as the protective film 18, the pixel electrode 20 cannot be overlapped with the data line 22 or the gate line 24.

In order to limit a parasitic capacitance caused by the overlapping area, U.S. Pat. No. 5,920,084 has suggested an appropriate thickness and dielectric constant of the organic protective film. In the aforementioned patent, a thickness of the organic protective film 28 was set to be more than 1.5 $\mu$m (preferably 2 to 3 $\mu$m). A dielectric constant of the organic protective film 28 was set to be less than 3.0. If the organic protective film 28 is set to have a high thickness and a low dielectric constant thereof, then a parasitic capacitance caused by the overlapping area is decreased as indicated in the above formula (1).

However, a rotation speed (RPM) at the time of the spin coating is lowered when a thickness of the organic protective film 28 is high, so that coating non-uniformity in the organic insulating film is increased and the evenness therein is deteriorated. Accordingly, a thickness recovery of the organic protective film 28 may be not only weakened, but also a residual of the organic protective film 28 may be left within the contact hole 32 for contacting the pixel electrode 20 with the source electrode 16 during the dry etching, or the source electrode 16 may be damaged or open-circuited due to the over etching. As a result, a contact resistance is increased or an open-circuit defect is generated between the pixel electrode 20 and the source electrode 16. Also, if a thickness of the organic protective film 28 becomes high, then a photoresist masked on the organic protective film 28 is thickened to that extent so as to protect the organic protective film 28 during the dry etching and a thickness non-uniformity in the photoresist is increased. For instance, when a thickness of the organic protective film 28 made from Benzocyclobutene (BCB) is 1.5 $\mu$m and a thickness of the gate insulating film 6 is 0.6 $\mu$m, a thickness of the photoresist is about 2.4 $\mu$m. A thickness uniformity in the photo resist can be assured when a thickness of the photoresist is less than 2.5 $\mu$m, but it is difficult to form a thickness of the photoresist uniformly when a thickness of the photoresist is more than 2.5 $\mu$m. Also, if a thickness of the photoresist becomes high, then a time required for the etching, the exposure and the development during the dry etching is increased to that extent to thereby reduce the productivity.

SUMMARY OF THE INVENTION

Accordingly, the present invention is directed to a liquid crystal display device and a method of fabricating the same that substantially obviates one or more of the problems due to limitations and disadvantages of the related art.

An object of the present invention is to provide a liquid crystal display device with a high aperture ratio having pixel electrodes overlapped with signal wiring that is capable of speeding up the data charging time of liquid crystal pixel cells.

Further object of the present invention is to provide a method of fabricating a liquid crystal display device with a high aperture ratio having pixel electrodes overlapped with signal wiring that is capable of speeding up the data charging time of liquid crystal pixel cells.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a thickness and a dielectric constant of the organic insulating film are set such that a signal delay at the gate line and the data line is reduced.

In another aspect of the present invention, a thickness of the organic insulating film is set such that an open circuit and a poor contact between a source electrode of the thin film transistor and the pixel electrode can be prevented.

According to still another aspect of the present invention, a thickness of the organic insulating film is set within a range of 0.8 to 1.5 $\mu$m such that an open circuit and a poor contact between a source electrode of the thin film transistor and the pixel electrode can be prevented and that a signal delay at the gate line and the data line can be reduced.

According to still another aspect of the present invention, a method of fabricating a liquid crystal display device includes the steps of forming the thin film transistor, the gate line and the data line on a transparent substrate; forming the organic insulating film on the transparent substrate to a thickness of 0.8 to 1.5 $\mu$m such that an open circuit and a poor contact between a source electrode of the thin film transistor and the pixel electrode can be prevented and that a signal delay at the gate line and the data line can be reduced; and forming the pixel electrode on the organic insulating film in such a manner to be overlapped, by a predetermined area, with at least one of the gate line and the data line.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, an example of which is illustrated in the accompanying drawings.

Figure 4:
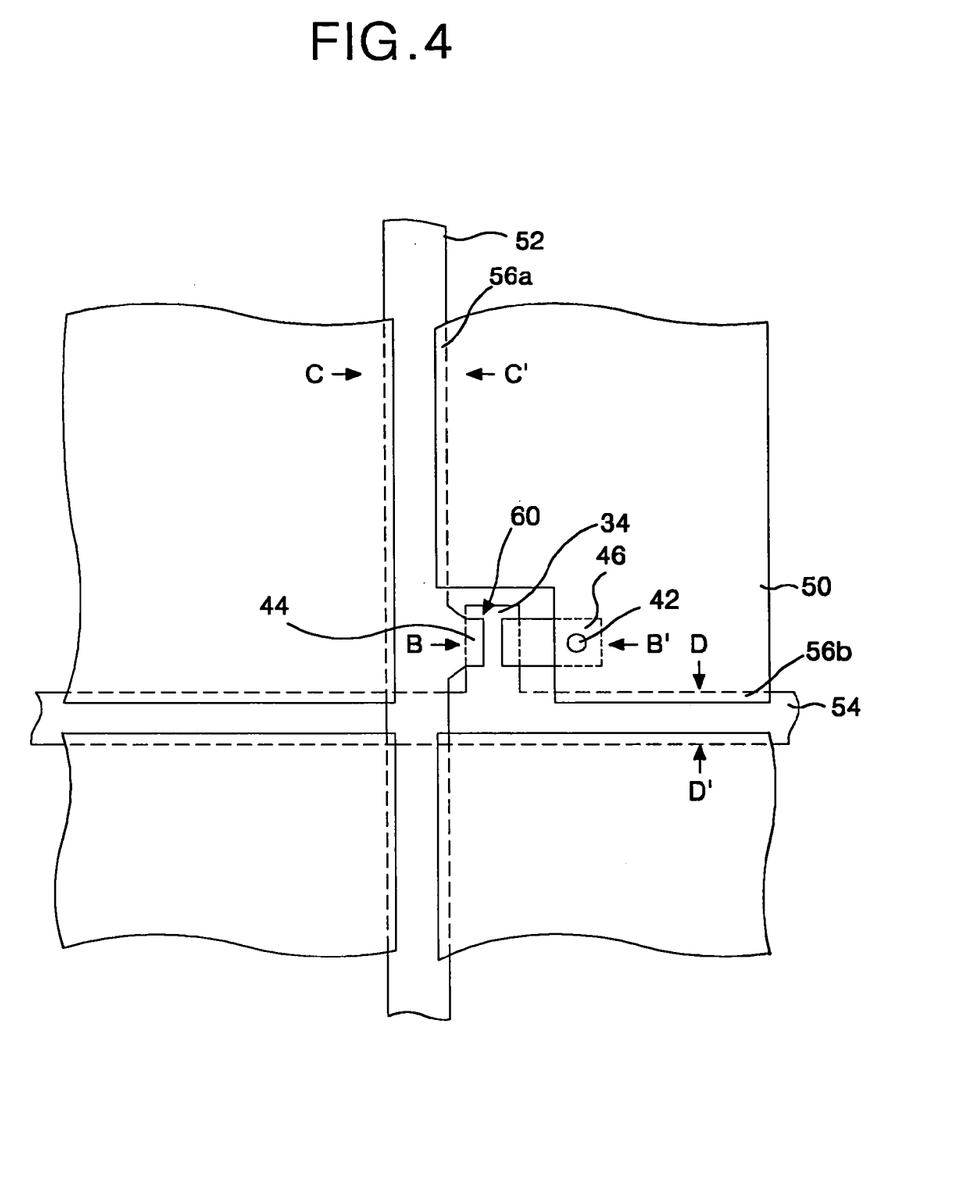
FIG. 4 is a plan view showing the structure of a liquid crystal display device according to a preferred embodiment.

Referring to FIG. 4, there is shown a liquid crystal display device with a repair function according to a preferred embodiment. In the liquid crystal display device, a TFT 60 is formed at an intersection between a data line 52 and a gate line 54, and pixel electrodes 50 overlapping with the data line 52 and the gate line 54 are arranged in a matrix pattern. The data line 52 applies a video signal to each liquid crystal pixel cell. The gate line 54 applies a gate pulse synchronized with the video signal to a gate electrode 34 of the TFT 60. Each liquid crystal pixel cell includes a liquid crystal layer injected between the pixel electrode 50 and a common electrode (not shown). The liquid crystal layer is driven with an electric field between the pixel electrode 50 and the common electrode to control a transmitted light quantity of an incident light received via a transparent substrate. Thus, the liquid crystal pixel cell charges a video signal in an interval when the gate pulse remains at a high level to thereby display a picture.

The edge of the pixel electrode 50 is overlapped with signal wiring, that is, the sides of the data line 52 and the gate line 54. Accordingly, an aperture ratio of the liquid crystal pixel cell is enlarged by a distance between the pixel electrode and the signal wiring, compared with the conventional liquid crystal display device in which the pixel electrode is not overlapped with the signal wiring. At overlapping lines 56a and 56b existing in the overlapping areas between the pixel electrode 50 and the signal wiring 52 and 54, light received from a back light (not shown) is blocked by means of the signal wiring 52 and 54 made from a metal. By the overlapping lines 56a and 56b, a parasitic capacitance is generated at the data line 52 and the gate line 54. In the present liquid crystal display device, a signal delay caused by the overlapping line is minimized, limiting the thickness and dielectric constant of the organic protective film made from an organic insulating film so that the liquid crystal pixel cell can charge to more than 95% of the video signal valve within about ½ of the gate pulse interval. Also, the organic protective film must be coated uniformly on the entire panel and etched uniformly. This will be described in detail with reference to FIG. 5 to FIG. 7, representing the detailed structure of the TFT and the overlapping lines 56a and 56b.

Figure 5:
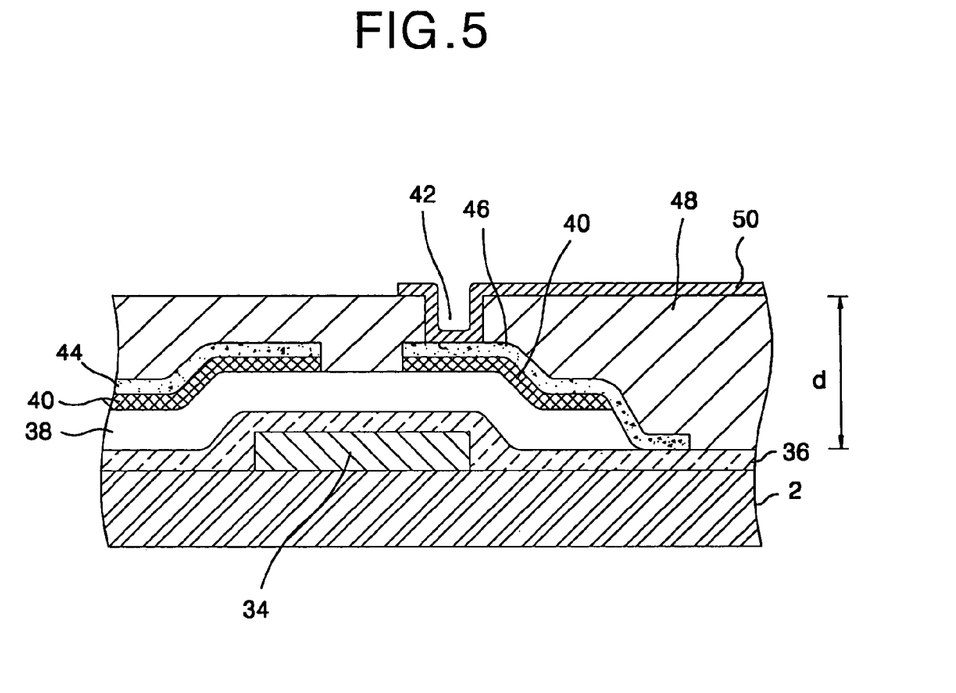
FIG. 5 is a sectional view of the thin film transistor taken along B–B' line in FIG. 4.
Figure 6:
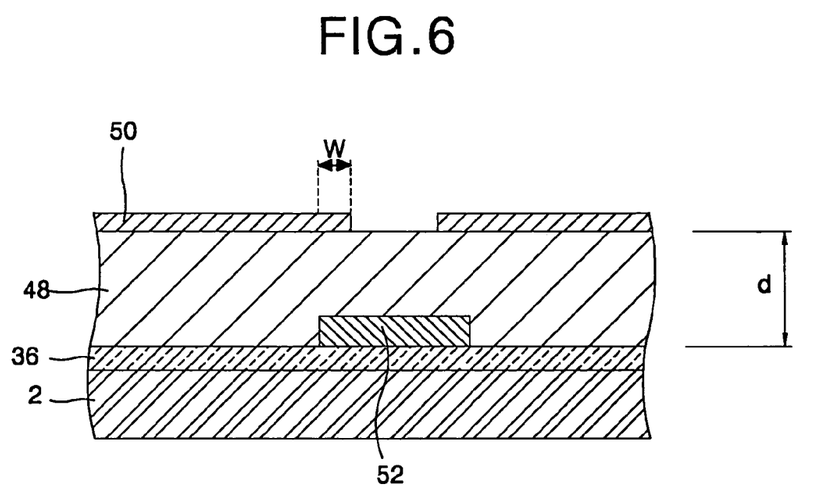
FIG. 6 is a sectional view of an overlapping area between the pixel electrode and the data line taken along C–C' line in FIG. 4.
Figure 7:
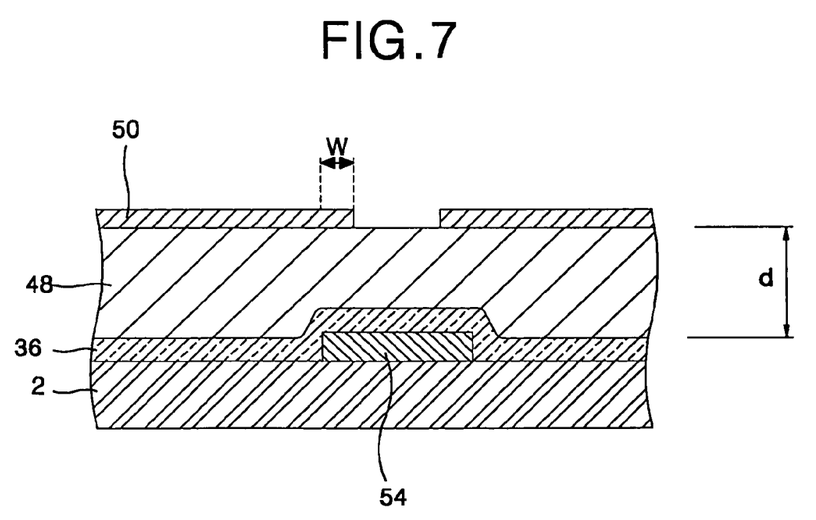
FIG. 7 is a sectional view of an overlapping area between the pixel electrode and the gate line taken along D–D' line in FIG. 4.

Referring to FIG. 5 to FIG. 7, the TFT 60 includes a gate electrode 34 connected to the gate line 54, a drain electrode 44 connected to the data line 52 and a source electrode connected to the pixel electrode 50. In order to form the gate electrode 34 and the gate line 54, a metal layer is deposited to a thickness of about 2500 Å on a substrate 2 by sputtering and the vacuum vapor deposition. The metal layer is patterned by reaction ion etching after a photo mask is formed. After the gate electrode 34 and the gate line 54 are formed on the transparent substrate 2, a gate insulating film 36 made from a dielectric material such as $SiN_x$ is deposited on the transparent substrate 2 by plasma enhanced chemical evaporation to cover the gate electrode 34 and the gate line 54. This gate insulating film 36 has a thickness of about 2000 to 3000 Å. A semiconductor layer 38 made from a-Si is deposited to a thickness of about 2000 Å on the gate insulating film 36, and an Ohmic contact layer 40, comprising amorphous silicon (a-Si) doped with n+ ions, is deposited to a thickness of about 500 Å thereon. The semiconductor layer 38 and Ohmic contact layer 40 cover the gate insulating film 36 on the gate insulating electrode 34. The drain electrode 44 and the source electrode 46 each made from a metal are deposited into a thickness of about 500 to 2000 Å on the Ohmic contact layer 40. The drain electrode 44 and the source electrode 46 are patterned in such a manner as to be spaced apart by a predetermined channel width. Subsequently, the Ohmic contact layer 40 is etched along a channel defined between the drain electrode 34 and the source electrode 36 to expose the semiconductor layer 38.

On the transparent substrate 2 formed with the TFT 60, the data line 52 and the gate line 54 in this manner, the organic protective film 48 made from an organic insulating film having a dielectric constant of less than 3.0 (e.g., from BCB having a dielectric constant of 2.7) is spin-coated to a thickness of about 0.8 to 1.5 $\mu$m. At this time, the organic protective film 48 on the data line 52 and the gate line 54, that is, the organic protective film 48 within the overlapping lines 56a and 56b, preferably has a thickness of about 1.25 to 1.27 $\mu$m. The organic protective film 48 covers the entire transparent substrate 2 evenly, being deposited by the spin coating technique. After the organic protective film 48 is cured in a nitrogen atmosphere, a portion of organic protective film 48 covering each source electrode 46 is etched. The exposed portion of the source electrode 46 makes a contact hole 42 for connecting the source electrode 46 to the pixel electrode 50. On the organic protective film 48 provided with the contact hole 42, the pixel electrode 50 made from Indium-Tin-Oxide (ITO) is entirely deposited to a thickness of about 1200 to 3000 Å. The ITO material comprising the pixel electrode 50 also is deposited within the contact hole 42 to be connected to the source electrode 46. Finally, the pixel electrode 50 deposited on the organic protective film 48 is patterned by etching after it is photo-masked in such a manner that its edge is overlapped with the sides of the data line 52 and the gate line 54 as shown in FIG. 6 and FIG. 7.

A width (W) of the overlapping lines 56a and 56b in which the pixel electrode 50 is overlapped with the data line 52 and the gate line 54 is set to be more than 1.5 $\mu$m, as shown in FIG. 6 and FIG. 7, so as to prevent light from being leaked between the signal wiring 52 and 54 and the pixel electrode 50.

Figure 8:
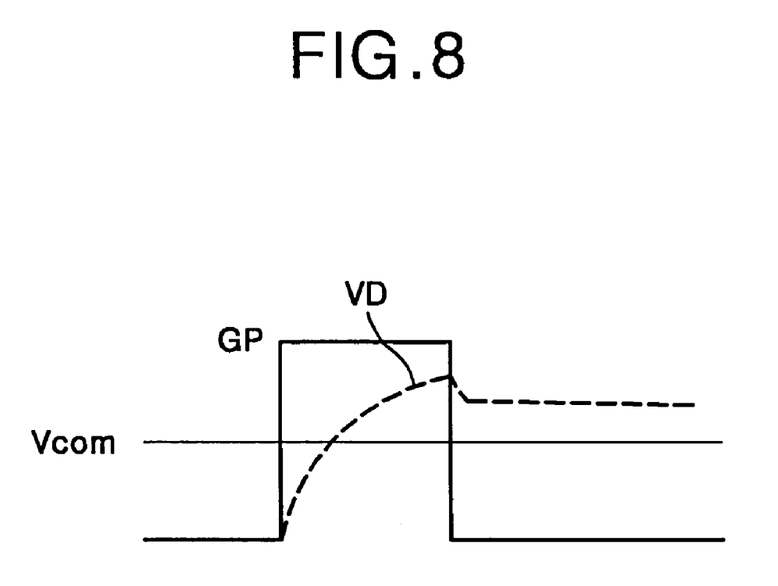
FIG. 8 is a waveform diagram representing a video data charge in a liquid crystal pixel cell when a gate pulse is applied.

In the liquid crystal display device as described above, the liquid crystal pixel cell must have an ability to charge to more than 95% of the video signal valve within about ½ interval of the gate pulse, to prevent a distortion of the picture. More specifically, the liquid crystal cell must charge above 95% of a difference voltage between a video signal VD and a common voltage Vcom within a high logic interval of the gate pulse GP applied to the gate electrode 34, that is, approximately ½ interval of an interval when a channel is defined between the drain electrode 44 and the source electrode 46 as shown in FIG. 8. After the liquid crystal pixel cell charges the remaining difference voltage between the video signal VD and the common voltage Vcom in the remaining interval when the gate pulse GP remains at a high level, it maintains the charged voltage until the gate pulse GP is changed to a high level again at the next frame. In the case of a panel with a XGA class resolution (i.e., 768 gate lines×1024 data lines×3 RGB), the time during which the gate pulse GP remains at a high level is 21.7 $\mu$s, because the frame frequency is approximately 60 Hz. Considering a timing margin between the gate pulses, the time for which the gate pulse GP remains at a high level is set to be about 18 $\mu$s. Accordingly, the liquid crystal cell must achieve more than 95% of the video signal (VD) within about 10 $\mu$s (preferably 9 $\mu$s). Such a charge time in the liquid crystal pixel cell changes in accordance with the parasitic capacitance value in the overlapping lines 56a and 56b, which in turn depends upon thickness (d) and dielectric constant (ε) of the organic protective film 48.

Figure 9:
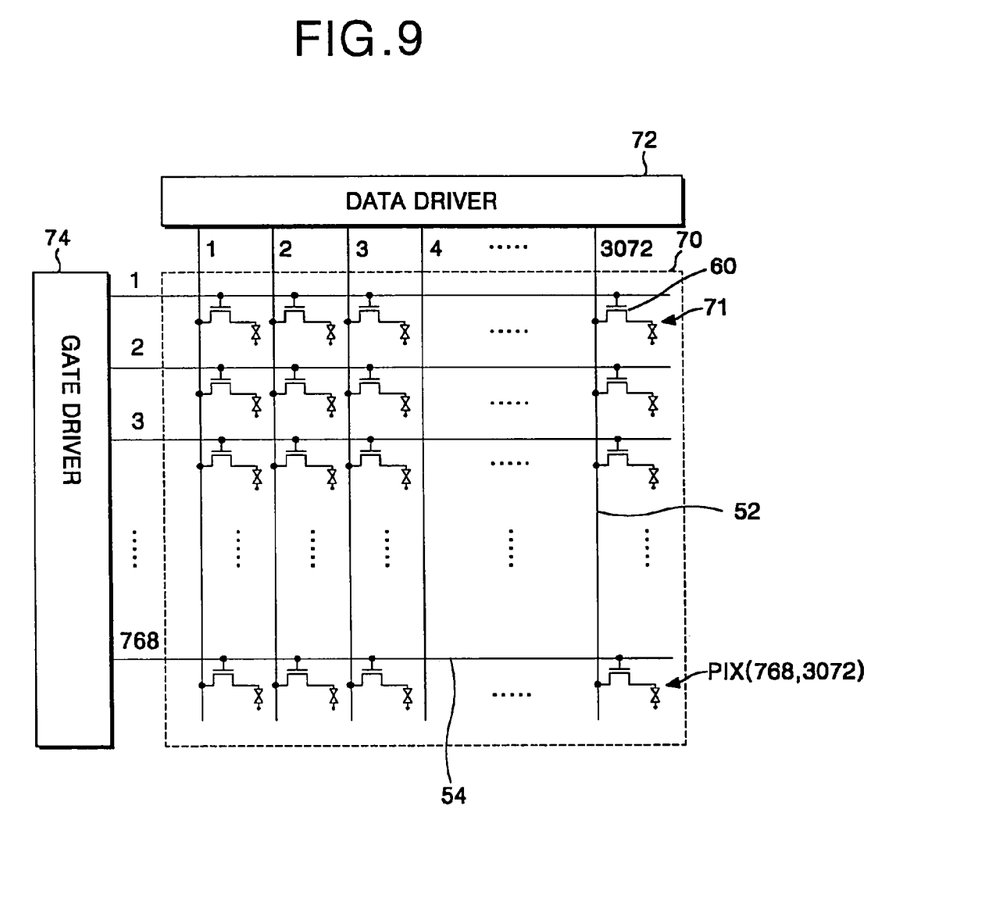
FIG. 9 is a plan view showing the configurations of a liquid crystal panel with an XGA class resolution to which the organic protective film in FIG. 4 is applied, and a driver thereof.

Referring now to FIG. 9, there is shown a liquid crystal panel 70 having liquid crystal cells 71 arranged in a matrix pattern between the 768 gate lines 54 and the 3072 data lines 52. Gate lines 54 in the liquid crystal panel 70 are connected to a gate driver 74 to apply a gate pulse GP from the gate driver 74. Data lines 52 are connected to a data driver 72 to supply data for one line synchronized simultaneously with the gate pulse GP from the data driver 72. In such a liquid crystal panel 70, a pixel with the largest signal delay is a pixel located at the farthest position from the data driver 72 and the gate driver 74. A pixel with the largest signal delay is located between the 768-numbered gate line 54 and the 3072-numbered data line 52.

Figure 10:
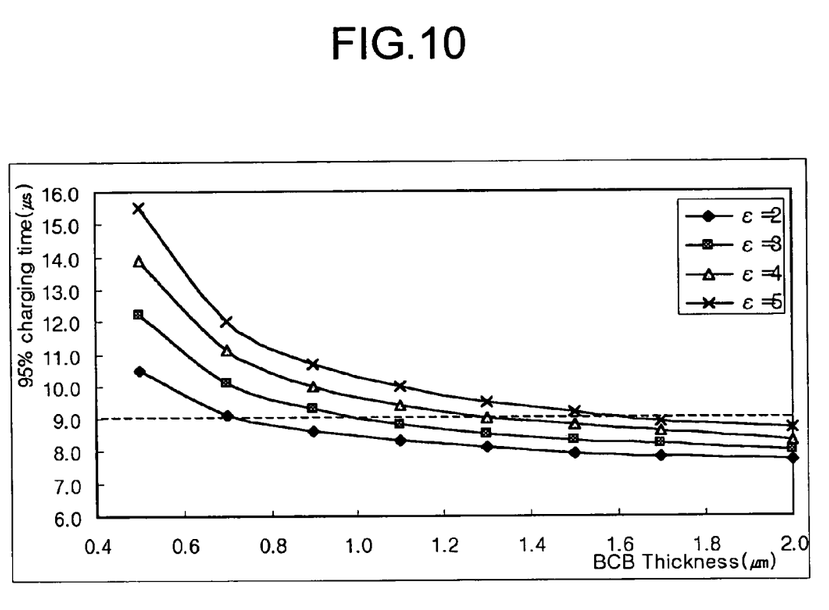
FIG. 10 is a characteristic diagram representing a data discharge time in a liquid crystal pixel cell according to the thickness and dielectric constant of the organic protective film shown in FIG. 4.

As seen from the following Table 1 and FIG. 10, a condition in which more than 95% of the video signal VD can be charged for this pixel (PIX(768,3072)) within a charge time of about 10 μs is satisfied where the organic protective film 48 has a thickness (d) of 0.8 μm of less and a dielectric constant (ε) of less than 3.0 and a case where the organic protective film 48 has a thickness (d) of 1.3 μm or 1.5 μm and a dielectric constant (E) of less than 4.0.

TABLE 1

| ε | .5 μm | .7 μm | .8 μm | .9 μm | 1.1 μm | 1.3 μm | 1.5 μm |
|---|---|---|---|---|---|---|---|
| 2 | 10.5 μs | 9.1 μs | 8.8 μs | 8.6 μs | 8.3 μs | 8.1 μs | 7.9 μs |
| 3 | 12.2 μs | 10.1 μs | 9.6 μs | 9.3 μs | 8.8 μs | 8.5 μs | 8.3 μs |
| 4 | 13.9 μs | 11.1 μs | 10.5 μs | 10.0 μs | 9.4 μs | 9.0 μs | 8.8 μs |
| 5 | 15.5 μs | 12.0 μs | 11.3 μs | 10.7 μs | 10.0 μs | 9.5 μs | 9.2 μs |

Also, the video signal VD can be sufficiently charged rapidly in a charge time (i.e., 9.3 μs) when a thickness (d) of the organic protective film 48 is 0.9 μm and a dielectric constant (ε) thereof is 3 in accordance with a timing margin between gate pulses. A thickness of the organic protective film 48 is limited to at most 1.5 μm in consideration of the coating uniformity and the etching uniformity in the organic protective film 48 as mentioned above.

In this case, the parasitic capacitance in the overlapping line 56a wherein the pixel electrode 50 is overlapped with the data line 52 is as indicated in the following table:

TABLE 2

| ε | 0.5 μm | 0.7 μm | 0.8 μm | 0.9 μm | 1.1 μm | 1.3 μm | 1.5 μm |
|---|---|---|---|---|---|---|---|
| 2 | .000305 Pf | .000201 pF | .000177 pF | .000159 pF | .000135 pF | .000119 pF | .000107 pF |
| 3 | .000402 pF | .000272 pF | .000238 pF | .000213 pF | .000179 pF | .000157 pF | .000141 pF |
| 4 | .000533 pF | .000341 pF | .000297 pF | .000265 pF | .000223 pF | .000194 pf | .000174 pf |
| 5 | .000644 pF | .000409 pF | .00355 pF | .000316 pF | .000264 pF | .000231 pF | .000206 pF |

In the table 2, parasitic capacitance values are values measured when a thickness of the organic protective film 48 coated on the data line 52 is 1.25 μm and an area (A) of the overlapping line 56a at which the pixel electrode 50 is overlapped with the data line 52 is 8371 μm². The area (A) is a case where a length in the longitudinal side of the pixel cell (PIX(768,3072)) is 279 μm and a width of the overlapping line 56a at which the pixel electrode 50 is overlapped with the data line 52 is 3 μm. On the other hand, the parasitic capacitance of the overlapping line 56b where the pixel electrode 50 is overlapped with the gate line 54 is greater than the parasitic capacitance of the overlapping line 56a because a thickness of the organic protective film 48 is thinner than that between the pixel electrode 50 and the data line 52.

As described above, the liquid crystal display device and the fabricating method thereof as disclosed herein reduces a signal delay in a liquid crystal display device with a high aperture ratio overlapping the pixel electrode and the signal wiring by providing an organic protective film having a dielectric constant of less than 3.0 and a thickness of 0.8 to 10.5 μm between at least one of the gate line and the data line and the pixel electrode, thereby speeding up a data charge time in the liquid crystal pixel cell. Also, the liquid crystal display device and the fabricating method thereof disclosed herein can not only sufficiently assure the coating uniformity in the organic protective film by coating the organic protective film to a thickness of less than 1.5 μm, but also it can minimize the possibility of an open-circuit or a poor contact between the transistor and the pixel electrode by uniformly performing the contact hole etching for connecting the pixel electrode to the source electrode of the TFT.

It will be apparent to those skilled in the art that various modifications and variation can be made in the liquid crystal display device and the method of fabricating the same of the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device including a thin film transistor formed at an intersection between a gate line and a data line, and a pixel electrode connected to a source electrode of the thin film transistor and overlapped with at least one of the gate line and the data line with having an organic insulating film therebetween, said method comprising:

forming the thin film transistor, the gate line and the data line on a transparent substrate;

forming the organic insulating film on the transparent substrate to a thickness of between 0.8 μm and 1.51 μm; and forming the pixel electrode on the organic insulating film so as to be overlapped, by a predetermined area, with the gate line and the data line, wherein a thickness of the organic insulating film in an overlapping area between the pixel electrode and the data line is different from a thickness of the organic insulating film in an overlapping area between the pixel electrode and the gate line.

2. The method according to claim 1, wherein a thickness of the organic insulating film provided between the pixel electrode and at least one of the gate line and the data line is less than 1.3 μm.

3. The method according to claim 1, wherein a dielectric constant of the organic insulating film is less than 3.0.

4. The method according to claim 3, wherein the organic insulating film is made from Benzocyclobutene.

5. The method according to claim 1, wherein a parasitic capacitance in an overlapping area where the pixel electrode is overlapped with said at least one of the gate line and the data line is less than 0.0003 pF.

6. The method according to claim 1, wherein a width of an overlapping area at which the pixel electrode is overlapped with said at least one of the gate line and the data line is greater than 1.5 μm.

7. A liquid crystal display device, comprising:
a data line on a substrate;
a gate line on the substrate;
a thin film transistor formed at an intersection of the gate line and the data line on the substrate;
an organic insulating film formed on the thin film transistor, the gate line, and the data line to a thickness of between 0.8 μm and 1.5 μm; and
a pixel electrode formed on the organic insulating film and connected to a source electrode of the thin film transistor, said pixel electrode overlapping the gate line and the data line, wherein a thickness of the organic insulating film in an overlapping area between the pixel electrode and the data line is different from a thickness of the organic insulating film in an overlapping area between the pixel electrode and the gate line.

8. The thin film transistor of claim 7, wherein the organic insulating film has a dielectric constant of less than 3.0.

9. The liquid crystal display device according to claim 8, wherein the organic insulating film is made from Benzocyclobutene.

10. The liquid crystal display device according to claim 7, wherein the thickness of the organic insulating film is less than 1.3 μm.

11. The liquid crystal display device according to claim 10, wherein the thickness of the organic insulating film is between 1.25 μm and 1.27 μm.

12. The liquid crystal display device according to claim 7, wherein a parasitic capacitance in an overlap area where the pixel electrode overlaps at least one of the gate line and the data line is less than 0.0003 pF.

13. A liquid crystal display device including a thin film transistor formed at an intersection between a gate line and a data line, and a pixel electrode connected to a source electrode of the thin film transistor and overlapped with at least one of the gate line and the data line with having an organic insulating film therebetween, wherein a thickness and a dielectric constant of the organic insulating film are selected such that a signal delay is less than 10 μsec for each of the gate lines and the data line, wherein the thickness and the dielectric constant of the organic insulating film are selected such that a liquid crystal pixel cell driven with the pixel electrode charges to a voltage which is more than 95% of a video data voltage within ½ of an enabling interval of a control signal that is applied to a gate electrode for defining a channel of the thin film transistor.

14. The liquid crystal display device according to claim 13, wherein the thickness of the organic insulating film is less than 1.5 μm.

15. The liquid crystal display device according to claim 13, wherein the thickness of the organic insulating film is between 0.8 μm and 1.5 μm.

16. The liquid crystal display device according to claim 13, wherein the thickness of the organic insulating film provided between at least one of the gate line and the data line and the pixel electrode is less than 1.3 μm.

17. The liquid crystal display device according to claim 13, wherein the thickness of the organic insulating film provided between said at least one of the gate line and the data line and the pixel electrode is 1.25 to 1.27 μm.

18. The liquid crystal display device according to claim 13, wherein the dielectric constant of the organic insulating film is less than 3.0.

19. The liquid crystal display device according to claim 18, wherein the organic insulating film is made from Benzocyclobutene.

20. The liquid crystal display device according to claim 13, wherein a parasitic capacitance in an overlap area where the pixel electrode is overlapped with said at least one of the gate line and the data line is less than 0.0003 pF.

21. A liquid crystal display device including a thin film transistor formed at an intersection between a gate line and a data line, and a pixel electrode connected to a source electrode of the thin film transistor and overlapped with at least one of the gate line and the data line with having an organic insulating film therebetween wherein the thickness and the dielectric constant of the organic insulating film are selected such that a liquid crystal pixel cell driven with the pixel electrode charges to a voltage which is more than 95% of a video data voltage within ½ of an enabling interval of a control signal that is applied to a gate electrode for defining a channel of the thin film transistor.

22. The liquid crystal display device according to claim 21, wherein a dielectric constant of the organic insulating film is less than 3.0.

23. The method according to claim 1, wherein a thickness of the organic insulating film provided between the pixel electrode and at least one of the gate line and the data line is between 1.25 μm and 1.27 μm.

24. The method according to claim 1, wherein the thickness and the dielectric constant of the organic insulating film are selected such that a liquid crystal pixel cell driven with the pixel electrode charges to a voltage which is more than 95% of a video data voltage within ½ of an enabling interval of a control signal that is applied to a gate electrode for defining a channel of the thin film transistor.

25. The liquid crystal display device according to claim 13, wherein the liquid crystal pixel cell includes a cell having a largest signal delay.

26. The liquid crystal display device according to claim 25, wherein the liquid crystal pixel cell is located at a lower right corner of the display device.

27. The liquid crystal display device according to claim 13, wherein the pixel electrode is overlapped with the gate line and the data line, wherein a parasitic capacitance in an overlapping area between the pixel electrode and the data line is different from a parasitic capacitance in an overlapping area between the pixel electrode and the gate line.

28. The liquid crystal display device according to claim 27, wherein the thickness of the organic insulating film is less than 1.5 μm.

29. The liquid crystal display device according to claim 27, wherein the thickness of the organic insulating film is between 0.8 μm and 1.5 μm.

30. The liquid crystal display device according to claim 27, wherein the thickness of the organic insulating film provided between at least one of the gate line and the data line and the pixel electrode is less than 1.3 µm.

31. The liquid crystal display device according to claim 27, wherein the thickness of the organic insulating film provided between said at least one of the gate line and the data line and the pixel electrode is 1.25 to 1.27 µm.

32. The liquid crystal display device according to claim 27, wherein the dielectric constant of the organic insulating film is less than 3.0.

33. The liquid crystal display device according to claim 32, wherein the organic insulating film is made from Benzocyclobutene.

34. The liquid crystal display device according to claim 27, wherein a parasitic capacitance in an overlap area where the pixel electrode is overlapped with said at least one of the gate line and the data line is less than 0.0003 pF.

35. The liquid crystal display device of claim 7, wherein the thickness and the dielectric constant of the organic insulating film are selected such that a liquid crystal pixel cell driven with the pixel electrode charges to a voltage which is more than 95% of a video data voltage within ½ of an enabling interval of a control signal that is applied to a gate electrode for defining a channel of the thin film transistor.

36. The liquid crystal display device according to claim 21, wherein a thickness of the organic insulating film is between 0.8 µm and 1.5 µm.

37. The liquid crystal display device according to claim 21, wherein a thickness of the organic insulating film provided between the pixel electrode and at least one of the gate line and the data line is between 1.25 µm and 1.27 µm.

38. The liquid crystal display device according to claim 21, wherein a thickness of the organic insulating film provided between the pixel electrode and at least one of the gate line and the data line is less than 1.3 µm.

39. The liquid crystal display device according to claim 21, wherein the organic insulating film is made from Benzocyclobutene.

40. The liquid crystal display device according to claim 21, wherein a parasitic capacitance in an overlapping area where the pixel electrode is overlapped with at least one of the gate line and the data line is less than 0.0003 pF.

41. The liquid crystal display device according to claim 21, wherein a width of an overlapping area at which the pixel electrode is overlapped with at least one of the gate line and the data line is greater than 1.5 µm.

42. The liquid crystal display device according to claim 21, wherein the liquid crystal pixel cell includes a cell having a largest signal delay.

43. The liquid crystal display device according to claim 42, wherein the liquid crystal pixel cell is located at a lower right corner of the display device.

44. The liquid crystal display device according to claim 21, wherein the pixel electrode is overlapped with the gate line and the data line, wherein a parasitic capacitance in an overlapping area between the pixel electrode and the data line is different from a parasitic capacitance in an overlapping area between the pixel electrode and the gate line.

45. The liquid crystal display device according to claim 44, wherein a thickness of the organic insulating film is between 0.8 µm and 1.5 µm.

46. The liquid crystal display device according to claim 44, wherein a thickness of the organic insulating film provided between the pixel electrode and at least one of the gate line and the data line is between 1.25 µm and 1.27 µm.

47. The liquid crystal display device according to claim 44, wherein a thickness of the organic insulating film provided between the pixel electrode and at least one of the gate line and the data line is less than 1.3 µm.

48. The liquid crystal display device according to claim 44, wherein the organic insulating film is made from Benzocyclobutene.

49. The liquid crystal display device according to claim 44, wherein a parasitic capacitance in an overlapping area where the pixel electrode is overlapped with at least one of the gate line and the data line is less than 0.0003 pF.

50. The liquid crystal display device according to claim 44, wherein a width of an overlapping area at which the pixel electrode is overlapped with at least one of the gate line and the data line is greater than 1.5 µm.

51. The liquid crystal display device according to claim 44, wherein the liquid crystal pixel cell includes a cell having a largest signal delay.

52. The liquid crystal display device according to claim 51, wherein the liquid crystal pixel cell is located at a lower right corner of the display device.

* * * * *